UNITED STATES PATENT OFFICE.

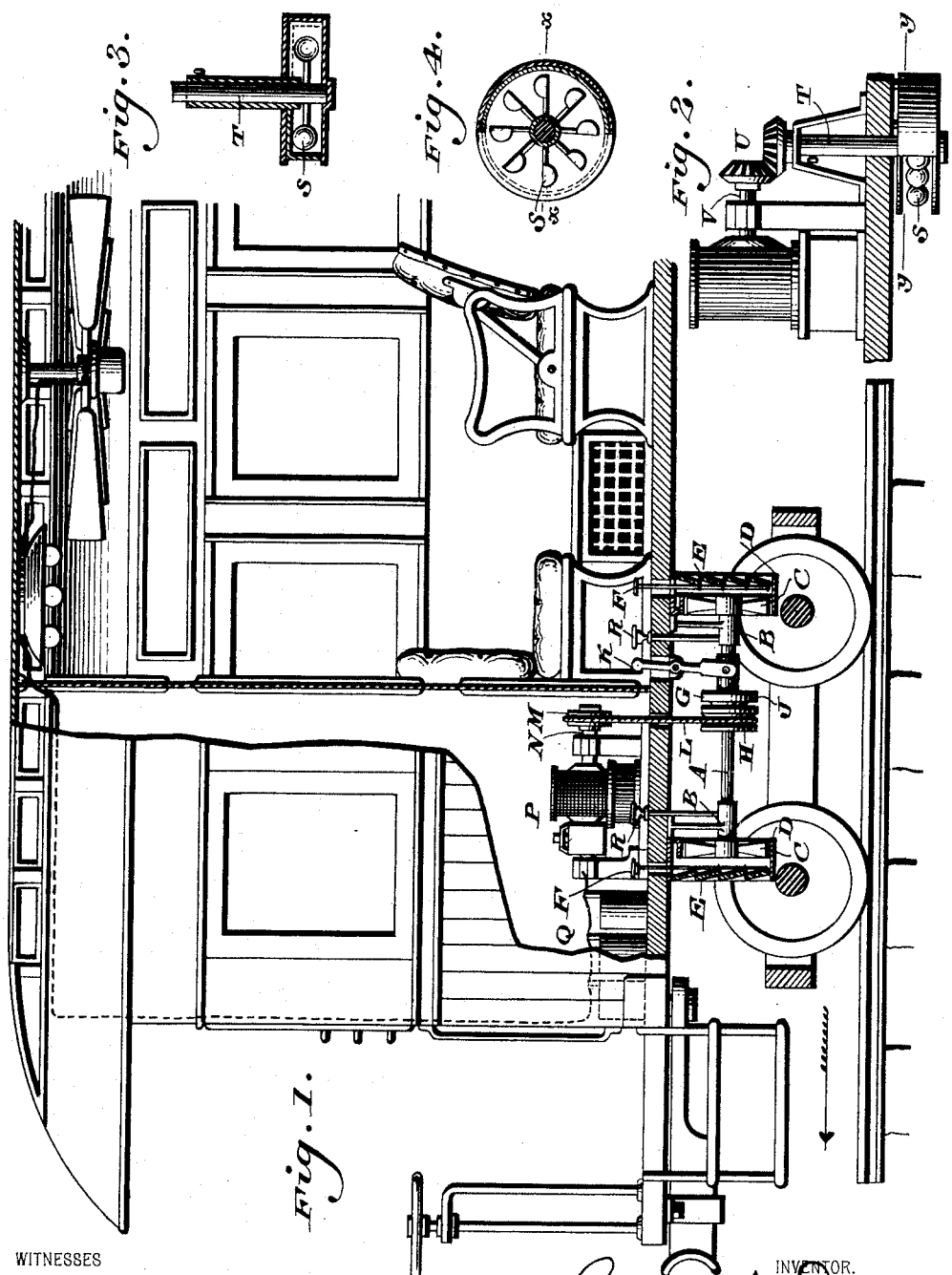

CLARENCE A. EVANS, OF UPLAND, PENNSYLVANIA.

PNEUMATIC MOTOR FOR ELECTRIC APPLIANCES FOR CARS.

SPECIFICATION forming part of Letters Patent No. 616,301, dated December 20, 1898.

Application filed July 13, 1897. Serial No. 644,372. (No model.)

*To all whom it may concern:*

Be it known that I, CLARENCE A. EVANS, a citizen of the United States, residing at Upland, in the county of Delaware, State of Pennsylvania, have invented a new and useful Improvement in Pneumatic Motors for Electrical Appliances for Cars or other Vehicles, which improvement is fully set forth in the following specification and accompanying drawings.

My invention consists of a pneumatic motor, substantially as hereinafter described, applicable to a car or other vehicle whereby a dynamo may be operated for the purposes of an electric light, a heater, a fan, or other translating device, said motor being also adapted to be regulated or adjusted and rendered inoperative when so desired.

Figure 1 represents a partial side elevation and a partial vertical section of a pneumatic motor for electrical appliances of a car embodying my invention. Fig. 2 represents a side elevation of a modification thereof. Fig. 3 represents a vertical section on line $x$ $x$, Fig. 4. Fig. 4 represents a horizontal section on line $y$ $y$, Fig. 2.

Similar letters of reference indicate corresponding parts in the figures.

Referring to the drawings, A designates a shaft which is mounted in hangers B, attached to a suitable portion of the body of a car, in the present case to the under side of the floor thereof. Secured to the ends of said shaft are wind-wheels C, which are properly inclosed in casings D, attached to said floor. In front of one of the wind-wheels and at the rear of the other are the dampers E, which are of any desired construction, and are connected with the rods F for operating the same, it being noticed that the heads of said rods are convenient of access within the body of the car.

On the shaft A is a clutch G, which consists in part of the loose belt or band wheel H and the controlling or shifting member J, the latter having connected with it the lever K, whereby the clutch may be coupled to cause the operation of the belt or band L, which passes around the member H and also around the pulley M on the shaft of the dynamo P, adjacent to which is the storage battery Q, both of which parts are located convenient of access within the body of the car. Wires or conductors lead from said battery to an electric light, a ventilating-fan, a heater, or other electrically-operated or translating device or appliance serviceable in a car.

The operation is as follows: When the car is running in the direction of the arrow, Fig. 1, and the damper E properly opened and adjusted so that air reaches the wheel D, the latter rotates and its power is communicated to the shaft A, and consequently to the dynamo, thus causing an electrical generation, the current or electricity being stored in the battery Q, the current running from said battery and operating the electric light or other appliances as has been stated.

When service of the device is not required, the damper E is closed and the clutch is opened, or both, so that the dynamo is rendered inoperative.

Provision is made for lubricating the shaft A by means of the oil-cups R and attached conduits leading to the hangers B.

In Figs. 2, 3, and 4 I show another form of wind-wheel different from that shown in Fig. 1, said wheel S being connected with the shaft T, which by means of beveled gear U imparts motion to the shaft V of the dynamo.

It will be seen in Fig. 1 that each end of the shaft A is provided with a wind-wheel C, which is adapted for operating said shaft A in either direction of the running of the car; but to this I do not limit myself, nor to the details shown and described, as the same may be varied without departing from the spirit of the invention.

While each car is equipped with a wind-wheel and connections with the dynamo, electric wires or conductors may pass from one car to another, so that should the dynamo and storage battery in one car be inoperative for any cause said car may receive electric current from the adjacent car in order to operate the electric light, &c., of the former.

Having thus described my invention, what I claim as new, and desire to secure by Letters Patent, is—

A car having depending hangers, a shaft mounted thereon, a wind-wheel connected with said shaft, a casing surrounding said wheel, a damper on said casing, a clutch on the said shaft, means within the car for operating said clutch, and adjusting said damper, and a dynamo having its shaft operated by that of the wind-wheel.

CLARENCE A. EVANS.

Witnesses:
 JOHN A. WIEDERSHEIM,
 WM. C. WIEDERSHEIM.